United States Patent
Kamikawa

(10) Patent No.: US 10,480,586 B2
(45) Date of Patent: Nov. 19, 2019

(54) CONSTANT VELOCITY JOINT AND MANUFACTURING METHOD THEREFOR

(71) Applicant: HONDA MOTOR CO., LTD., Tokyo (JP)

(72) Inventor: Mitsuru Kamikawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 259 days.

(21) Appl. No.: 15/416,200

(22) Filed: Jan. 26, 2017

(65) Prior Publication Data

US 2017/0219015 A1 Aug. 3, 2017

(30) Foreign Application Priority Data

Feb. 1, 2016 (JP) ................. 2016-016838

(51) Int. Cl.
| | |
|---|---|
| *F16D 3/223* | (2011.01) |
| *B24C 1/10* | (2006.01) |
| *C23C 4/02* | (2006.01) |
| *C23C 4/12* | (2016.01) |
| *F16D 3/205* | (2006.01) |
| *F16D 3/84* | (2006.01) |

(52) U.S. Cl.
CPC ............. *F16D 3/223* (2013.01); *B24C 1/10* (2013.01); *C23C 4/02* (2013.01); *C23C 4/12* (2013.01); *F16D 3/2055* (2013.01); *F16D 3/845* (2013.01); *F16D 2003/22323* (2013.01); *Y10S 72/714* (2013.01); *Y10S 464/903* (2013.01); *Y10S 464/905* (2013.01); *Y10S 464/906* (2013.01)

(58) Field of Classification Search
CPC .... F16D 3/223; F16D 3/2055; F16D 2300/10; F16D 2003/22309; F16D 2250/0053; F16D 2250/0038; F16D 3/845; F16D 2003/22323; C23C 4/10; C23C 4/06; C23C 4/12; C23C 4/02; B24C 1/10; Y10S 464/903; Y10S 464/905; Y10S 72/714; Y10S 464/906
USPC ................................................. 464/111, 145
See application file for complete search history.

(56) References Cited

U.S. PATENT DOCUMENTS

| | | |
|---|---|---|
| 6,602,358 B1 | 8/2003 | Ochi et al. |
| 2013/0252748 A1 | 9/2013 | Sugiyama et al. |

FOREIGN PATENT DOCUMENTS

| | | |
|---|---|---|
| JP | 60-002659 | 1/1985 |
| JP | 03-103369 | 4/1991 |
| JP | 08-134622 | 5/1996 |
| JP | 2000-154828 | 6/2000 |

(Continued)

OTHER PUBLICATIONS

Bec Crew, New 'Super-Steel' Alloy is a strong as Titanium, But 10 Times Cheaper, Feb. 2015, [retrieved on Mar. 11, 2019]. Retrieved from the Internet : <URL:https://www.sciencealert.com/>]. (Year: 2015).*

(Continued)

*Primary Examiner* — Greg Binda
(74) *Attorney, Agent, or Firm* — Rankin, Hill & Clark LLP

(57) ABSTRACT

A first constant velocity joint is equipped with a cup part made of a light alloy. First ball grooves that receive a torque from torque transmitting members are formed on an inner wall of the cup part. A high hardness layer made of ceramic or cermet as a principal component thereof is formed on an inner surface of the cup part including at least inner surfaces of the first ball grooves.

10 Claims, 3 Drawing Sheets

(56) References Cited

FOREIGN PATENT DOCUMENTS

| JP | 2009-293728 | 12/2009 |
|----|-------------|---------|
| JP | 2009-299838 | 12/2009 |
| JP | 2013-194895 | 9/2013  |

OTHER PUBLICATIONS

Japanese Office Action dated May 22, 2018 with English translation, 10 pages.
Japanese Office Action dated Sep. 12, 2017, partial English translation included, 5 pages.
Japanese Office Action with English translation dated Mar. 20, 2018, 6 pages.

* cited by examiner

CONSTANT VELOCITY JOINT AND MANUFACTURING METHOD THEREFOR

CROSS-REFERENCE TO RELATED APPLICATION

This application is based upon and claims the benefit of priority from Japanese Patent Application No. 2016-016838 filed on Feb. 1, 2016, the contents of which are incorporated herein by reference.

BACKGROUND OF THE INVENTION

Field of the Invention

The present invention relates to a constant velocity joint and a manufacturing method therefor, in which transmission of torque between an outer member and an inner member is carried out through a torque transmitting member.

Description of the Related Art

With a power transmission mechanism for an automobile or the like, a rotational driving force is transmitted from one transmission shaft to another transmission shaft using a constant velocity joint (constant velocity universal joint) interposed between the respective transmission shafts. Generally, among the transmission shafts, a Birfield type constant velocity joint is interposed between a drive shaft and a hub (outboard side), and a tripod type constant velocity joint is interposed between a differential gear and the drive shaft (inboard side).

These constant velocity joints include an outer member connected to one of the transmission shafts, an inner member fixed in position on a distal end part of the other transmission shaft, and a torque transmitting member that carries out transmission of torque interposed between the outer member and the inner member. Further, as a material of such constant velocity joints, steel normally is employed from the standpoints of manufacturing costs, moldability, and the like.

For example, in a Birfield type constant velocity joint, the outer member includes a cup part in which a bottomed hole is formed into which the inner member is inserted, and a shaft that is connected to the transmission shaft is formed to project outwardly on an outer wall of a bottom section of the cup part. Plural individual first ball grooves separated mutually at equal intervals are formed on the inner wall of the outer member.

The inner member has an annular shape on which plural individual second ball grooves are provided on an outer circumferential wall thereof. The torque transmitting member is made up from a plurality of balls inserted in a rollable manner, respectively, between the first ball grooves and the second ball grooves. More specifically, by the balls being placed in contact with each of the first ball grooves and the second ball grooves, transmission of torque is carried out via the balls (torque transmitting members) between the outer member and the inner member.

On the other hand, in a tripod type constant velocity joint, the outer member includes a cup part on which a shaft is formed to project in the same manner as the aforementioned Birfield type constant velocity joint, and plural track grooves separated mutually at equal intervals are formed on the inner wall of the outer member. The inner member is a so-called spider, including an annular part, and a plurality of trunnions that project from the outer circumferential surface of the annular part. The inner member is inserted into the cup part so that the trunnions are accommodated respectively inside the track grooves of the outer member.

The torque transmitting members are substantially annular bodies, which are fitted rotatably on each of the trunnions of the inner member, and slide against the inner walls of the track grooves. Stated otherwise, inner circumferential walls of the rollers contact the outer walls of the trunnions, and the outer circumferential walls of the rollers contact the inner walls of the track grooves, whereby transmission of torque is carried out via the rollers (torque transmitting members) between the outer member and the inner member.

Consequently, the inner surfaces of the cup part, and in particular the inner surfaces of the first ball grooves or the inner surfaces of the track grooves, are likely to experience wear and abrasion caused by contact with the torque transmitting members (the balls or the rollers). In order to suppress such wear and abrasion, for example, in Japanese Laid-Open Patent Publication No. 2000-154828, it has been proposed to form a hardened layer by applying a heat treatment to the inner surfaces, etc., of the cup part.

SUMMARY OF THE INVENTION

Incidentally, in recent years, attempts have been made to lessen the weight of an automobile with the aim of reducing fuel consumption or the like. From this standpoint, demands have increased for reducing the weight of constant velocity joints that make up constituent elements of the automobile. Generally, although it may be attempted to reduce weight by making the constant velocity joints smaller in scale, there is a limit to the weight that can be reduced by such miniaturization. Thus, for example, it may be considered to form the cup part of the outer member from a light alloy that is lighter than steel.

However, with a cup part made of a light alloy, it is likely that the hardness thereof would be insufficient, more so than in the case of a cup part made of steel, and it also is difficult to form a hardened layer by carrying out a heat treatment on inner surfaces thereof in order to increase wear resistance. More specifically, when the cup part is made of a light alloy in order to reduce the weight of the constant velocity joint, it is likely for the inner surfaces of the cup part to experience wear and abrasion, and therefore, there is a concern that the durability of the constant velocity joint will be lowered.

A principal object of the present invention is to provide a constant velocity joint that is both lightweight and excellent in durability, and adequately increases wear resistance of inner surfaces of a cup part made of a light alloy.

Another object of the present invention is to provide a manufacturing method for manufacturing the aforementioned constant velocity joint.

According to an embodiment of the present invention, a constant velocity joint is provided, comprising an outer member including a cup part, an inner member inserted into the outer member, and a torque transmitting member configured to carry out transmission of torque and interposed between the outer member and the inner member, wherein the cup part is made of a light alloy, including a groove formed on an inner wall of the cup part, the groove receives the torque from the torque transmitting member, and the cup part further comprises a high hardness layer made of ceramic or cermet as a principal component thereof on an inner surface of the cup part including at least an inner surface of the groove. In this instance, the principal component is defined by a proportion of the ceramic or cermet contained within the high hardness layer, and the proportion thereof may be roughly 80 atm % or more, or may be 100 atm %.

The constant velocity joint according to the present invention, by including the cup part made of a light alloy, for example, is lighter in weight than a constant velocity joint having a cup part made of steel, and thus the weight thereof can effectively be reduced. Further, the high hardness layer made of ceramic or cermet is formed on the inner surface of the cup part including at least the inner surface of the groove that receives torque. Owing thereto, wear and abrasion of the inner surface of the cup part can be suppressed. Consequently, a constant velocity joint can be obtained, which is both lightweight and excellent in durability.

Furthermore, since the high hardness layer can be subjected to a grinding process, the dimensions of the cup part after the high hardness layer has been formed can be adjusted. In accordance with this feature, the cup part can be formed in a desired shape without designing the mold for forging the cup part with excessively high precision, and therefore, the manufacturing process for the constant velocity joint can be simplified, and manufacturing costs can be reduced.

In the above-described constant velocity joint, the high hardness layer preferably is made up from a multilayer structure. In this case, it is possible to obtain a high hardness layer having in a composite manner various functions responsive to the materials and conditions of use of the constant velocity joint.

In the above-described constant velocity joint, preferably, concerning the multilayer structure of the high hardness layer, hardness of an outer layer side in contact with the torque transmitting member may be configured to be greater than hardness of an inner layer side in contact with the inner surface of the cup part. In this case, since the hardness of the outer layer side of the high hardness layer is large, abrasion due to torque transmission can effectively be suppressed. Further, since the hardness of the inner layer side of the high hardness layer can be made to approximate the hardness of the inner surface of the cup part, adhesion (close contact) between the high hardness layer and the inner surface of the cup part can be enhanced. Furthermore, by making the hardness of the inner layer side lower than the outer layer side of the high hardness layer, the buffering performance of the high hardness layer can be enhanced. More specifically, even in the case that the cup part becomes deformed when the constant velocity joint is used, since the high hardness layer is easily deformed in following relation with deformation of the cup part, the occurrence of peeling between the high hardness layer and the inner surface of the cup part can be prevented. Consequently, wear resistance of the inner surface of the cup part and durability of the high hardness layer can be enhanced more effectively.

In the above-described constant velocity joint, preferably, the high hardness layer may be provided on a shot peening processed part that is formed on the inner surface of the cup part including at least the inner surface of the groove. Since the shot peening processed part is fabricated with high hardness, which is higher than that of non-processed inner surfaces of the cup part, due to machine hardening, imparting of compressed residual stress, refining of crystalline grains of the surface, etc., the hardness thereof is made to approach the hardness of the high hardness layer. Further, the surface roughness of the shot peening processed part can be adjusted to an appropriate coarseness for forming the high hardness layer. Accordingly, the inner surface of the cup part and the high hardness layer can be more closely adhered to each other, and mutual peeling away of one from the other can effectively be suppressed.

In the above-described constant velocity joint, the high hardness layer preferably is a thermally sprayed layer. In comparison with a high hardness layer obtained by coating by way of chemical vapor deposition (CVD) or physical vapor deposition (PVD) and the like, or by adhesion using an adhesive agent, such a thermally sprayed high hardness layer increases the freedom in selection of materials, and easily enables a desired thickness and hardness. Consequently, a multilayer structure is facilitated by adjusting various conditions (spraying speed, spraying distance, spraying temperature, etc.) when thermal spraying is carried out, or by adjusting the grain diameter and type (components) of the material particles.

Further, since the thermally sprayed high hardness layer is formed by collision of the material of the high hardness layer against the inner surface of the cup part, machine hardening takes place, and compressive residual stress is imparted at the inner surface of the cup part. In accordance with this feature, since the high hardness layer can be formed while also increasing the hardness of the inner surface of the cup part, close contact between the inner surface of the cup part and the high hardness layer can easily and effectively be enhanced.

Furthermore, because the thermally sprayed high hardness layer differs from a hardened layer formed by carrying out a heat treatment on a cup part made from steel, and can be obtained without exposing the cup part to a heated environment, it is possible to avoid the occurrence of dimensional changes etc. due to thermal deformation of the cup part. Consequently, without designing a mold for forging the cup part taking into consideration beforehand dimensional changes or the like due to thermal deformation, a cup part having a desired shape can be formed. Owing to this feature, the manufacturing process for the constant velocity joint can be simplified, and manufacturing costs can be reduced.

Further still, the thermally sprayed high hardness layer can be formed with a smaller amount of consumption energy, in comparison with a high hardness layer etc. formed by induction hardening, which is generally carried out as a heat treatment. Owing to this feature as well, the manufacturing costs for the constant velocity joint can be reduced.

According to another embodiment of the present invention, a manufacturing method is provided for a constant velocity joint comprising an outer member including a cup part, an inner member inserted into the outer member, and a torque transmitting member configured to carry out transmission of torque and interposed between the outer member and the inner member, the manufacturing method comprising a high hardness layer forming step of forming a groove that receives the torque from the torque transmitting member on an inner wall of the cup part made of a light alloy, and forming a high hardness layer made of ceramic or cermet as a principal component thereof on an inner surface of the cup part including at least an inner surface of the groove.

With the manufacturing method for a constant velocity joint according to the present invention, by fabricating the cup part from a light alloy, the weight of the constant velocity joint can be reduced, and by forming the high hardness layer on the inner surface of the cup part, wear resistance of the inner surface of the cup part can be enhanced. Owing thereto, a constant velocity joint can be obtained, which is both lightweight and excellent in durability. Furthermore, since the high hardness layer can be subjected to a grinding process, the dimensions of the cup part after the high hardness layer has been formed can be adjusted. Consequently, manufacturing precision of the constant velocity joint can easily be enhanced.

In the above-described manufacturing method for the constant velocity joint, in the high hardness layer forming step, preferably, the high hardness layer made up from a multilayer structure is formed. In this case, it is possible to obtain a high hardness layer having in a composite manner various functions responsive to the materials and conditions of use of the constant velocity joint.

In the manufacturing method for the constant velocity joint, in the high hardness layer forming step, preferably, the multilayer structure of the high hardness layer is formed in a manner that hardness of an outer layer side of the high hardness layer in contact with the torque transmitting member is greater than hardness of an inner layer side of the high hardness layer in contact with the inner surface of the groove. In this case, wear resistance of the inner surface of the cup part, and adhesion (close contact) between the high hardness layer and the inner surface of the cup part can effectively be enhanced. Further, by making the hardness of the inner layer side lower than the outer layer side of the high hardness layer, the buffering performance of the high hardness layer can be enhanced. Consequently, wear resistance of the inner surface of the cup part and durability of the high hardness layer can be enhanced more effectively.

In the above-described manufacturing method for the constant velocity joint, prior to the high hardness layer forming step, there preferably is included a shot peening treatment step of implementing a shot peening treatment on the inner surface of the cup part including at least the inner surface of the groove. More specifically, with the shot peening treatment step, the shot peening processed part is formed in which high hardness and adjustment of surface roughness are achieved with respect to the inner surface of the cup part. By forming the high hardness layer on the shot peening processed part, the inner surface of the cup part and the high hardness layer can be more suitably adhered to (in close contact with) each other, and mutually peeling away of one from the other can effectively be suppressed.

In the above-described manufacturing method for the constant velocity joint, in the high hardness layer forming step, preferably, the high hardness layer is formed by thermal spraying. In this case, the high hardness layer can easily be formed with a desired thickness and hardness, while additionally, machine hardening etc. can be made to take place on the inner surface of the cup part against which the material of the high hardness layer was made to collide. Therefore, wear resistance of the inner surface of the cup part can suitably be enhanced, and by the hardnesses of the high hardness layer and the inner surface of the cup being made to approach one another, peeling away of the high hardness layer from the inner surface can be suppressed.

Furthermore, because the high hardness layer can be formed without exposing the cup part to a heated environment, the dimensional changes of the cup part due to thermal deformation can be avoided. In accordance with this feature, it is possible to eliminate a complex design concerning a mold for forging the cup part, and the cup part can be formed easily and with high accuracy. Furthermore, the high hardness layer can be formed with a smaller amount of consumption energy, for example, than a case in which a high hardness layer is formed by induction hardening. Consequently, the manufacturing process for the constant velocity joint can be simplified, and manufacturing costs can be reduced.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Concerning the constant velocity joint according to the present invention, a preferred embodiment in relation to a manufacturing method therefor will be described in detail below with reference to the accompanying drawings.

Figure 1:
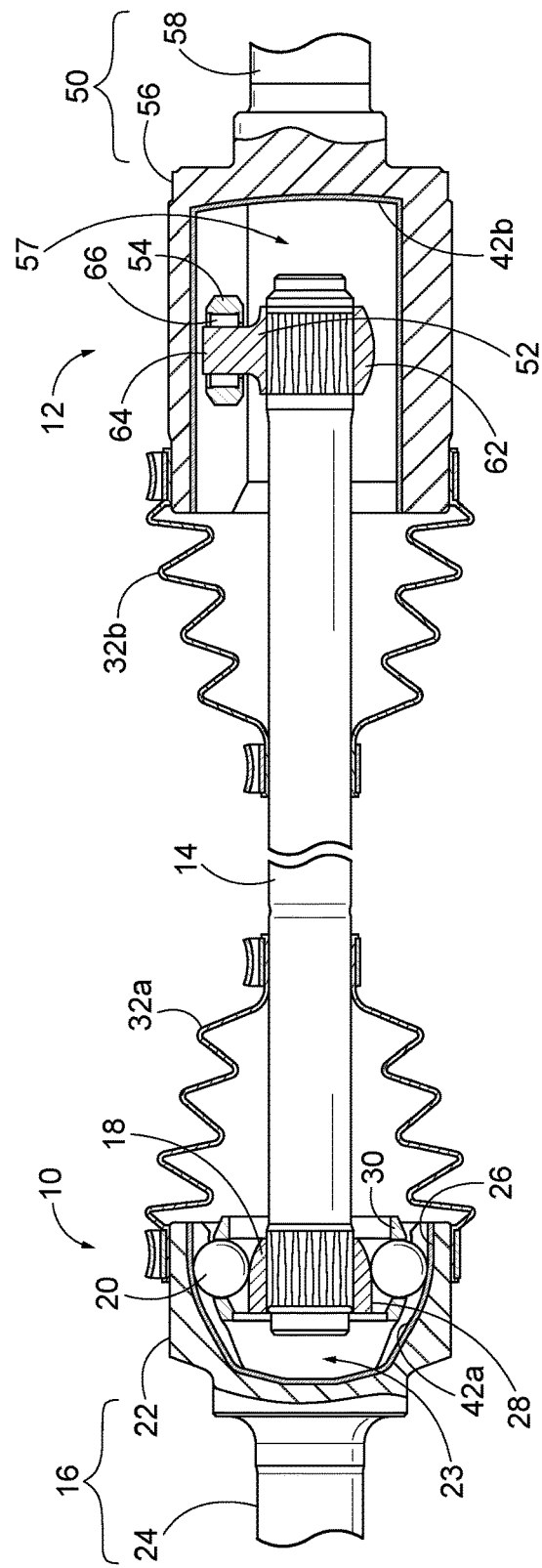
FIG. 1 is a schematic cross-sectional view of main components of a power transmission mechanism equipped with constant velocity joints (a first constant velocity joint and a second constant velocity joint) according to an embodiment of the present invention.

The constant velocity joint according to the present invention can be applied even to joints that are interposed between any of transmission shafts provided on an inboard side and an outboard side of a power transmission mechanism for an automobile or the like. Therefore, in relation to the present embodiment, as shown in FIG. 1, an example will be described in which a first constant velocity joint 10 thereof is a Birfield type constant velocity joint provided on the outboard side, and a second constant velocity joint 12 thereof is a tripod type constant velocity joint provided on the inboard side.

More specifically, the first constant velocity joint 10 is interposed between a drive shaft 14 and a hub (not shown), and the second constant velocity joint 12 is interposed between a differential gear (not shown) and the drive shaft 14.

First, a description will be made concerning the configuration of the first constant velocity joint 10. The first constant velocity joint 10 basically is constituted from an outer member 16, an inner member 18 made up from an inner ring, and torque transmitting members 20 made up from balls.

The outer member 16 includes a cup part 22 in which a bottomed hole 23 is formed, and a shaft 24 formed to protrude out from an outer wall of the cup part 22. The shaft 24 is connected integrally to the hub. The cup part 22 is formed of a light alloy that is lighter than steel. In this instance, the light alloy is an alloy mainly composed of a light metal such as aluminum, magnesium, titanium, or the like. The light alloy constituting the cup part 22 is not particularly limited, however, a light alloy having a tensile strength of 550 MPa or greater is preferred. As a preferred example of the light alloy, an aluminum alloy such as A7075-T651 or the like may be cited.

Further, on an inner surface of the cup part 22 in the form of a spherical surface, a plurality of, for example, six first ball grooves 26 are formed, which extend along the axial direction and at equal intervals, respectively, around a central axis. The respective other structural elements other than the cup part 22 of the first constant velocity joint 10 can be made from a material such as steel or the like.

The inner member 18 is of an annular shape in which plural second ball grooves 28 are disposed on an outer circumferential wall thereof in corresponding relation to the aforementioned first ball grooves 26, and is accommodated in the interior of the cup part 22. Further, the inner member 18 is spline-fitted onto one end of the drive shaft 14 through a hole formed in the center thereof.

The torque transmitting members 20 are arranged one each so as to be capable of rolling respectively between the mutually confronting first ball grooves 26 and the second ball grooves 28, and are held in a retainer 30 interposed between the inner member 18 and the inner surface of the cup part 22. By the torque transmitting members 20 each being in contact respectively with the first ball grooves 26 and the second ball grooves 28, transmission of torque is performed between the outer member 16 and the inner member 18.

A joint boot 32a made of rubber or resin having a bellows portion thereon is installed between the cup part 22 and the drive shaft 14. A grease composition serving as a lubricant is filled in the interior of the joint boot 32a in a sealed manner.

With the first constant velocity joint 10, a shot peening processed part 40a (see FIG. 2) is formed on an inner surface of the cup part 22, and a high hardness layer 42a is formed on the shot peening processed part 40a. The high hardness layer 42a will be described in detail later.

Next, a description will be given concerning the structure of the second constant velocity joint 12. The second constant velocity joint 12 basically is constituted from an outer member 50, an inner member 52 made up from a spider, and torque transmitting members 54 made up from rollers.

The outer member 50 includes a cup part 56 in which a bottomed hole 57 is formed, and a shaft 58 that is formed to protrude on an outer wall of the bottomed portion of the cup part 56. The shaft 58 is connected integrally with a differential gear. The cup part 56 is formed from a light alloy. In the same manner as the aforementioned cup part 22, an aluminum alloy such as A7075-T651 or the like preferably can also be used for the cup part 56. Three track grooves 60, for example, which are separated at equal intervals respectively around the axis, are formed on the inner surface of the cup part 56. Moreover, the respective constituent elements thereof except for the cup part 56 of the second constant velocity joint 12 can be constituted from steel or the like.

The inner member 52 includes an annular part 62, and plural trunnions 64 that project out respectively from an outer circumferential wall of the annular part 62. The inner member 52 is inserted into the cup part 56 in such a manner that the trunnions 64 are accommodated respectively inside the track grooves 60. Further, the annular part 62 is serration-fitted onto the other end of the drive shaft 14 through a hole that is formed in the center of the annular part 62.

The torque transmitting members 54 are annular shaped members, which are fitted rotatably on the trunnions 64 through a plurality of rolling bodies 66, and slide in contact with inner walls of the track grooves 60. More specifically, by inner circumferential walls of the torque transmitting members 54 contacting the outer walls of the trunnions 64, and outer circumferential walls of the torque transmitting members 54 contacting the inner walls of the track grooves 60, transmission of torque is performed through the torque transmitting members 54 between the outer member 50 and the inner member 52. The rolling bodies 66 may be roller bearings including, for example, needles, rollers, etc.

As with the joint boot 32a discussed above, a joint boot 32b is installed with a grease composition being filled in the interior thereof between the outer member 50 and the drive shaft 14 in a sealed manner.

With the second constant velocity joint 12, a shot peening processed part 40b (see FIG. 2) is formed on an inner surface of the cup part 56, and a high hardness layer 42b is formed on the shot peening processed part 40b. The shot peening processed part 40b and the high hardness layer 42b can be constituted in the same manner, respectively, as the shot peening processed part 40a and the high hardness layer 42a formed on the inner surface of the cup part 22 of the first constant velocity joint 10.

Thus, concerning the shot peening processed part 40a and the high hardness layer 42a, a detailed description thereof will be given in relation to the manufacturing method for the first constant velocity joint 10 according to the present embodiment, and a description concerning details of the shot peening processed part 40b and the high hardness layer 42b is omitted.

With the manufacturing method for the first constant velocity joint 10, for example, after having formed in a predetermined shape a light alloy by a hot forging or an extrusion method, dimensional precision is increased by lathe machining (turning process), whereby the cup part 22 is obtained having the first ball grooves 26 on the inner wall thereof. In addition, a shot peening treatment step (or a shot peening process step) for forming the shot peening processed part 40a is carried out by implementing a shot peening treatment on the inner surface of the cup part 22 including inner surfaces of at least the first ball grooves 26.

In the shot peening treatment step according to the present embodiment, the shot peening treatment is carried out by being divided into two stages. More specifically, after a first shot peening treatment has been performed, a second shot peening treatment is carried out with respect to the inner surface of the cup part 22.

The first shot peening treatment can be carried out by a known method without any particular limitation. However, in the case that the cup part 22 is formed from an aluminum alloy, as a shot material, steel balls having diameters of roughly 0.1 to 0.2 mm preferably are used.

In this case, even if the shot peening treatment is carried out over a long time period, for example, compared to a shot material made of other steel balls or the like, such a shot material is preferable as it is unlikely for deformation or a reduction in strength of the cup part 22 to occur. Further, since the surface quality can be modified by aiming intensively in the vicinity of the surface, it is possible to impart a compressive residual stress of two to three times that of normal. As a result, the crystalline grains on the inner surface of the cup part 22 can suitably be refined, and the hardness of the cup part 22 can be increased. The advantageous effect of being able to raise hardness by miniaturizing (refining) the crystalline grains can be realized remarkably in the case that the cup part 22 is formed from an aluminum alloy in particular.

Next, the second shot peening treatment is implemented with respect to the inner surface of the cup part 22. The second shot peening treatment is a so-called fine particle bombardment (FPB) treatment, using a shot material made of ultrafine particles, which are smaller in diameter than those used in the aforementioned first shot peening treatment. As a preferred example of such a shot material, there can be cited alumina ($Al_2O_3$) particles having a particle diameter on the order of 50 μm. However, regardless of the material, insofar as it can be ejected at ultrahigh speeds, the shot material may be any material, for example, such as ceramics other than alumina, as well as any metal material having a high melting point such as titanium (Ti), molybdenum (Mo), etc.

In the second shot peening treatment, the collision energy of the shot material made from the fine particles is introduced in a concentrated manner in the vicinity of a polar surface of the inner surface of the cup part 22. Therefore, in the shot peening processed part 40a formed by implementing both the first shot peening treatment and the second shot peening treatment, compared to an inner surface of the cup part 22 on which only the first shot peening treatment is implemented, the hardness and compressive residual stress can significantly be increased. Further, by performing the second shot peening treatment, since the constituent elements of the shot material made from the fine particles can be diffused within the surface, various effects of surface modification can be obtained.

With the shot peening treatment step, the hardness of the inner surface (shot peening processed part 40a) of the cup part 22 preferably is made with a Vickers hardness of 200 to 400 HV, in order to approximate the hardness of the high hardness layer 42a. Further, in the shot peening treatment step, the coarseness of the shot peening processed part 40a preferably is adjusted so as to become a coarseness suitable for forming the high hardness layer 42a. Consequently, close contact between the shot peening processed part 40a and the high hardness layer 42a can be enhanced, and the occurrence of mutual peeling between such members can be suppressed.

Next, a high hardness layer forming step for forming the high hardness layer 42a is carried out with respect to the shot peening processed part 40a. Although the high hardness layer 42a is capable of being formed by applying various techniques such as coating and adhesion, etc., the high hardness layer 42a preferably is formed by thermal spraying (plasma spraying and high speed flame spraying, etc.).

Through application of thermal spraying, the degree of freedom in selecting materials can be increased, while additionally, the high hardness layer 42a can be obtained efficiently and with high precision. Further, by adjusting various conditions (spraying speed, spraying distance, spraying temperature, etc.) during thermal spraying, and the particle size and type (components) of the material particles, a high hardness layer 42a of a multilayer structure can easily be formed with a desired hardness and thickness.

Thus, according to the present embodiment, a high hardness layer forming step will be described in which the high hardness layer 42a is formed by thermal spraying. More specifically, in the high hardness layer forming step, using a spray gun, not shown, the material particles are dissolved, and a film is formed by spraying the material onto the inner surface (shot peening processed part 40a) of the cup part 22. As shown in FIG. 1, the hardness layer 42a is formed onto the inner surface of the cup part 22 including an inner surface of the groove 26 and an inner bottom surface of the bottomed hole 23. As examples of the material particles, there may be cited ceramics such as alumina, silicon nitride ($Si_3N_4$) or the like, or cermets such as WC-10Co, WC-17Co, WC-10Co-7Ni, and WC-12Co-7Ni, etc. However, insofar as they satisfy a certain hardness standard, for the material particles, there can be used other cermets, ceramics, or metal materials such as molybdenum or the like.

During thermal spraying, in order to suppress an excessive rise in the temperature of the cup part 22, for example, the cup part 22 preferably is cooled by a non-illustrated cooling means. As the cooling means, a known method can be performed using a coolant medium such as cooling water or the like, so that the temperature of the cup part 22 can preferably be maintained at 100° C. or less.

Figure 2:
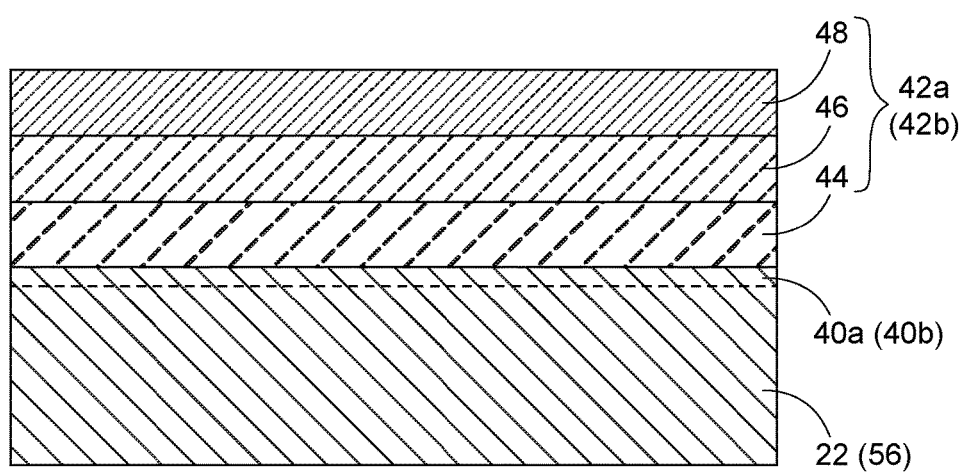
FIG. 2 is a partially enlarged view of a high hardness layer of the constant velocity joint of FIG. 1.

Further, in the high hardness layer forming step, the high hardness layer 42a having a three layer structure is formed by carrying out thermal spraying from the inner surface side of the cup part 22, while the thermal spaying conditions are changed in order of a first condition, a second condition, and a third condition. More specifically, as shown in FIG. 2, the high hardness layer 42a is made up from a three layer structure including an inner layer 44 formed with thermal spraying conditions during a first condition, an intermediate layer 46 formed with thermal spraying conditions during a second condition, and an outer layer 48 formed with thermal spraying conditions during a third condition. As such, the high hardness layer 42a is made up from a multilayer structure made of the material including ceramic or cermet as a principle component thereof.

Among each of the inner layer 44, the intermediate layer 46, and the outer layer 48, the hardness and components thereof are changed in a progressive or gradient manner. Consequently, although the respective layers of the high hardness layer 42a are not partitioned clearly by boarders, to facilitate description, among the high hardness layers 42a, locations thereof formed with the same thermal spraying conditions are regarded as single layers.

Because the inner layer 44 is in contact with the inner surface (shot peening processed part 40a) of the cup part 22, the inner layer 44 preferably is made with a hardness near to that of the inner surface. As a particular hardness value for the inner layer 44, a Vickers hardness of 600 to 800 HV, for example, is preferred. In order to form the inner layer 44, the material of the inner layer 44 is made to collide against the inner surface of the cup part 22, whereby machine hardening takes place, and compressive residual stress is imparted to the inner surface of the cup part 22. In accordance therewith, the hardness of the inner surface of the cup part 22 can be made to approach the hardness of the inner layer 44. As a result, close contact between the inner layer 44 and the cup part 22 can be enhanced.

Because the outer layer 48 contacts the torque transmitting members 20, the outer layer 48 preferably is made with a hardness that is capable of adequately suppressing wear and abrasion due to torque transmission from the torque transmitting members 20. As a particular hardness value for the outer layer 48, a Vickers hardness of 1000 to 1400 HV, for example, is preferred. Consequently, wear resistance of the inner surface of the cup part 22 can be improved, and durability of the first constant velocity joint 10 can be enhanced.

The intermediate layer 46 is interposed between the inner layer 44 and the outer layer 48. The hardness of the intermediate layer 46 preferably is greater than or equal to the hardness of the inner layer 44 and less than or equal to the hardness of the outer layer 48. As a particular hardness value for the intermediate layer 46, a Vickers hardness of 800 to 1000 HV, for example, is preferred. By providing the intermediate layer 46 having such a hardness, for example, even in the case that deformation of the cup part 22 takes place during usage of the first constant velocity joint 10, the high hardness layer 42a are easily deformed in following relation with such deformation. Consequently, the occurrence of peeling between the inner surface of the cup part 22 and the high hardness layer 42a can be suppressed.

Further, with the high hardness layer 42a in which the hardnesses of the inner layer 44, the outer layer 48, and the intermediate layer 46 have been set as described above, the hardness on the side of the inner layer 44 is smaller than on the side of the outer layer 48. Consequently, the intermediate layer 46 and the inner layer 44 realize a function as buffering members between the outer layer 48 and the inner surface of the cup part 22, and therefore, the buffering performance of the high hardness layer 42a can be enhanced. Owing to this feature as well, the occurrence of peeling between the inner surface of the cup part 22 and the high hardness layer 42a can be suppressed.

The thickness of the high hardness layer 42a, which is obtained by summing the respective thicknesses of the inner layer 44, the intermediate layer 46, and the outer layer 48, can be set arbitrarily depending on the material quality of the high hardness layer 42a and the cup part 22, etc., or other required characteristics, however, the thickness thereof preferably is 50 to 200 μm. More specifically, by having the thickness of the high hardness layer 42a be greater than or equal to 50 μm, the wear resistance of the inner surface of the cup part 22 can be enhanced sufficiently. Further, by the thickness of the high hardness layer 42a being less than or equal to 200 μm, peeling away of the high hardness layer 42a from the inner surface of the cup part 22 can effectively be suppressed. These effects can be obtained even more suitably by setting the thickness of the high hardness layer 42a to be from 70 to 100 μm.

The dimensions of the cup part 22 may be adjusted by further performing a grinding process to grind portions of the high hardness layer 42a. In this manner, with the cup part 22, after having formed the high hardness layer 42a thereon, the dimensions of the interior of the cup part 22 can be adjusted, and therefore, the dimensional precision of the cup part 22 can easily be improved.

Further, in the high hardness layer forming step for forming the high hardness layer 42a by thermal spraying, in contradistinction to forming the high hardness layer by way of a heat treatment on a cup part made from steel, there is no need to expose the cup part 22 to a heated environment. Therefore, even if the high hardness layer forming step is performed, dimensional changes etc. due to thermal deformation of the cup part 22 do not occur.

In accordance with this feature, without designing a mold for forging the cup part 22 with excessively high precision, the cup part 22 having a desired shape can be obtained. Consequently, the manufacturing process for the first constant velocity joint 10 can be simplified, and manufacturing costs can be reduced. Furthermore, the high hardness layer 42a can be formed with a smaller amount of consumption energy, for example, in comparison with a high hardness layer formed by induction hardening, which is generally carried out as a heat treatment, and thus owing to this feature as well, manufacturing costs can be reduced.

Next, the outer member 16 is constructed by joining the shaft 24 to an outer wall of the bottom part of the cup part 22. Further, by suitably combining the outer member 16 with the inner member 18, the torque transmitting members 20, the retainer 30, and the like, which are formed separately therefrom, the first constant velocity joint 10 can be obtained.

Because the first constant velocity joint 10 includes the cup part 22 made of a light alloy, for example, in comparison with a general constant velocity joint having a steel cup part, the weight of the cup part 22 can effectively be reduced. Further, on the inner surface of the cup part 22 including the inner surfaces of at least the first ball grooves 26 that receive torque, and the inner bottom surface of the bottomed hole 23, since the high hardness layer 42a is a multilayer structure provided having ceramic or cermet as a principal component thereof, wear and abrasion of the inner surfaces can effectively be suppressed. As a result, with the first constant velocity joint 10, it is possible to reduce weight without decreasing durability.

The second constant velocity joint 12 is constituted by and comprises the outer member 50, on which the shot peening processed part 40b and the high hardness layer 42b are formed on the inner surface of the cup part 56 made from a light alloy. Therefore, the same effects and advantages as those of the first constant velocity joint 10 can be obtained.

The present invention is not limited to the embodiments described above, and modifications may be made to the embodiments without departing from the essence and gist of the invention.

For example, according to the above-described embodiment, although each of the high hardness layers 42a, 42b have been described as a three layer structure made up from the inner layer 44, the intermediate layer 46, and the outer layer 48, the invention is not limited to this structure in particular. Each of the high hardness layers 42a, 42b, without being limited to the aforementioned three layer structure, may be adjusted appropriately so as to include in a composite manner various functions responsive to the materials and conditions of use of the first constant velocity joint 10 and the second constant velocity joint 12.

Figure 3:
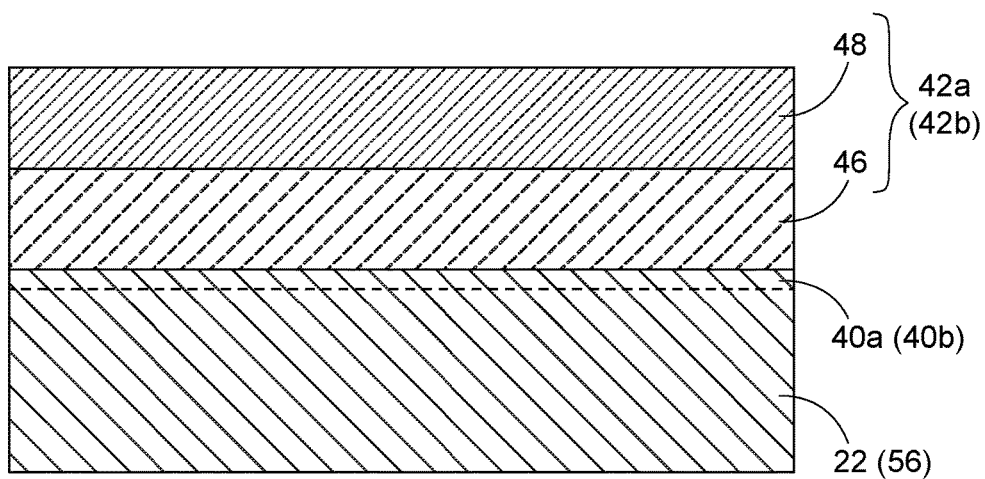
FIG. 3 is a partially enlarged view of a high hardness layer of a constant velocity joint according to another embodiment of the present invention.

More specifically, the high hardness layers 42a, 42b may be a signal layer structure, or may be a multilayer structure having two layers or four layers or greater. For example, in the case that the high hardness layers 42a, 42b are provided as a two layer structure, as shown in FIG. 3, the inner layer 44 may be dispensed with. In this case, the manufacturing process can be further simplified and manufacturing costs can be reduced, while adequately maintaining the durability of the first constant velocity joint 10 and the second constant velocity joint 12.

Further, according to the above-described embodiment, although a shot peening treatment is carried out by being divided into two stages of the first shot peening treatment and the second shot peening treatment, the invention is not limited to this feature in particular. For example, the high hardness layers 42a, 42b may be formed directly on the inner surfaces of the cup parts 22, 56 without carrying out the shot peening treatments, that is, without forming the shot peening processed parts. Further, the shot peening processed parts 40a, 40b may be formed by carrying out only the first shot peening treatment with respect to the inner surfaces of the cup parts 22, 56.

What is claimed is:
1. A constant velocity joint comprising an outer member including a cup part and a shaft, an inner member inserted into the outer member, and a torque transmitting member configured to carry out transmission of torque and interposed between the outer member and the inner member; wherein the shaft is made of steel,
the cup part is made of a light alloy in which a bottomed hole is formed,
the cup part has an inner wall on which a groove is formed, the groove receives the torque from the torque transmitting member, and the cup part further comprises a high hardness layer made up from a multilayer structure made of ceramic or cermet as a principal component thereof on an inner surface of the cup part including at least an inner surface of the groove and an inner bottom surface of the bottomed hole, and the high hardness layer is a thermally sprayed layer.

2. The constant velocity joint according to claim 1, wherein the multilayer structure of the high hardness layer is a three-layer structure.

3. The constant velocity joint according to claim 2, wherein, in the three-layer structure of the multilayer structure of the high hardness layer, hardness of an outer layer side in contact with the torque transmitting member is configured to be greater than hardness of an inner layer side in contact with the inner surface of the cup part.

4. The constant velocity joint according to claim 1, wherein the high hardness layer is provided on a shot peening processed part that is formed on the inner surface of the cup part including at least the inner surface of the groove.

5. The constant velocity joint according to claim 1, wherein among layers of the multilayer structure of the high hardness layer, hardness is changed in a gradient manner.

6. A manufacturing method for a constant velocity joint comprising an outer member including a cup part made of a light alloy and a shaft made of steel, an inner member inserted into the outer member, and a torque transmitting member configured to carry out transmission of torque and interposed between the outer member and the inner member, the manufacturing method comprising:

a high hardness layer forming step of forming a groove that receives the torque from the torque transmitting member on an inner wall of the cup part in which a bottomed hole is formed, and forming a high hardness layer made up from a multilayer structure made of ceramic or cermet as a principal component thereof on an inner surface of the cup part including at least an inner surface of the groove and an inner bottom surface of the bottomed hole, wherein the high hardness layer is a thermally sprayed layer.

7. The manufacturing method for the constant velocity joint according to claim 6, wherein in the high hardness layer forming step, the multilayer structure of the high hardness layer is formed as a three-layer structure.

8. The manufacturing method for the constant velocity joint according to claim 7, wherein in the high hardness layer forming step, the three-layer structure of the multilayer structure of the high hardness layer is formed in a manner that hardness of an outer layer side of the high hardness layer in contact with the torque transmitting member is greater than hardness of an inner layer side of the high hardness layer in contact with the inner surface of the groove.

9. The manufacturing method for the constant velocity joint according to claim 6, further comprising, prior to the high hardness layer forming step, a shot peening treatment step of implementing a shot peening treatment on the inner surface of the cup part including at least the inner surface of the groove.

10. The manufacturing method for the constant velocity joint according to claim 6, wherein among layers of the multilayer structure of the high hardness layer, hardness is changed in a gradient manner.

* * * * *